Dec. 16, 1969  W. D. LITTLE  3,484,599
OPTICAL PROJECTION SYSTEM
Filed Jan. 3, 1967  2 Sheets-Sheet 1
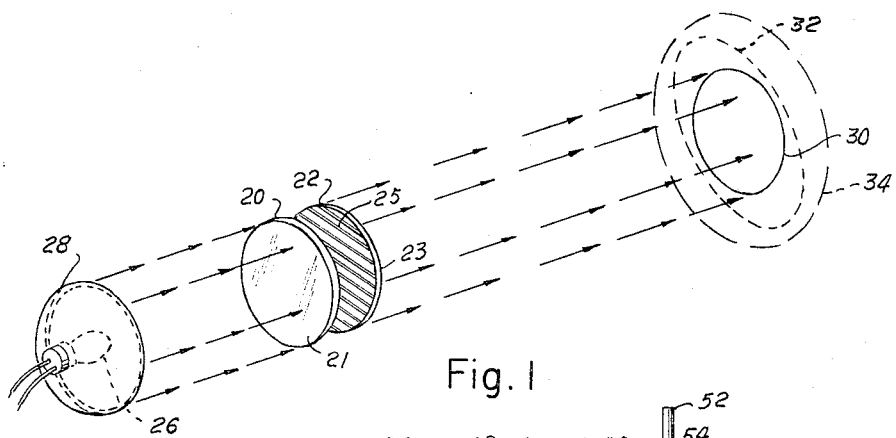
Fig. 1
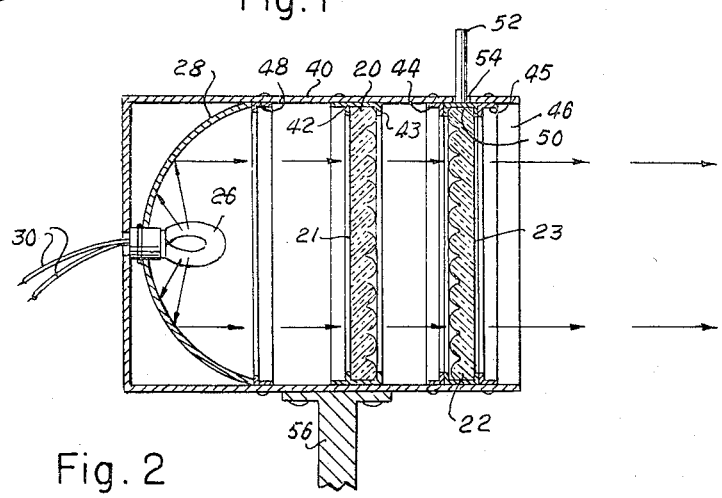
Fig. 2
Fig. 4
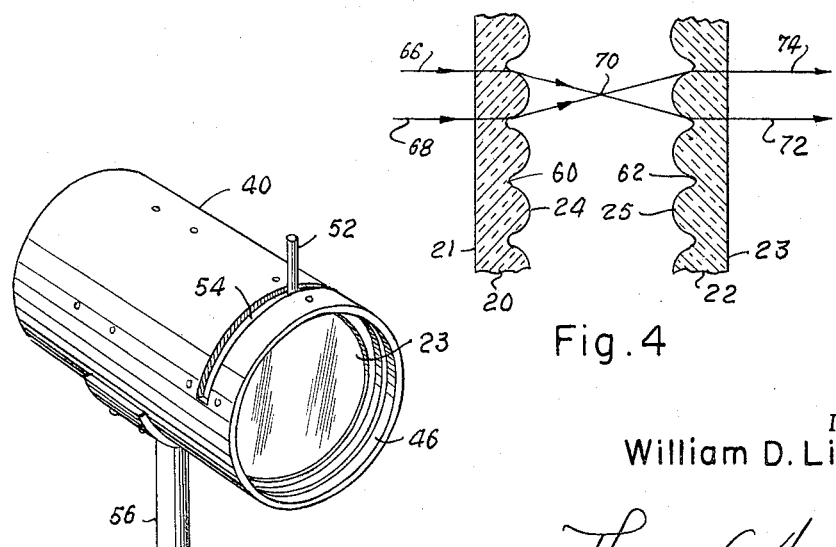
Fig. 3
INVENTOR
William D. Little
BY Thomas A. Harwood
ATTORNEY Dec. 16, 1969 W. D. LITTLE 3,484,599

OPTICAL PROJECTION SYSTEM

Filed Jan. 3, 1967 2 Sheets-Sheet 2

INVENTOR
William D. Little

BY Thomas A. Harwood

ATTORNEY

United States Patent Office 3,484,599
Patented Dec. 16, 1969

3,484,599
OPTICAL PROJECTION SYSTEM
William D. Little, 10507 Harry Hines Blvd.,
Dallas, Tex. 75220
Filed Jan. 3, 1967, Ser. No. 606,711
Int. Cl. F21v 13/04
U.S. Cl. 240—41.3                                4 Claims

ABSTRACT OF THE DISCLOSURE

An optical projection system for projecting light onto an object and for selectively varying the projected area of illumination on the object. The optical projection system has a projector housing, a light source within the housing and first and second refracting elements which can be rotated relative to each other to vary the area of projected illumination. The refracting elements have parallel cylindrical shaped lens surfaces facing each other and the elements are spaced apart by a distance equal to the addition of the focal lengths of the cylindrical shaped lens surfaces. Each refracting element has a planar face opposite the face having the cylindrical shaped surface.

---

This invention relates to an optical system for projecting light onto an object to provide a selectively variable, projected area of illumination on the object.

Conventional illumination systems, especially for soft lighting or spot flooding applications, are characterized by inefficiency and complexity of apparatus. For stage lighting and studio lighting applications, the spot flooding light projectors must be adapted to vary the area of illumination in order to accommodate for different physical settings. The inefficiency, however, of conventional projectors used for this purpose usually necessitates the use of many projectors to accomplish the desired results. Moreover, projectors that have the capability of producing a variable area of illumination are generally expensive in terms of the relatively complex apparatus required.

It is an object of this invention to provide a projector that produces an area of illumination that can be selectively varied, wherein the projector is efficient in terms of the percentage of light projected from the source of light employed for all areas of illumination and wherein the components of the system are inexpensive and the mechanism for varying the area of illumination is extremely simple.

It is also an object to provide such a system that can be employed for many and diverse applications, such as, for example, soft light or spot flooding applications for stage, conventional enclosures such as rooms, and outdoors, indicator signal applications, and many others.

With regard to conventional lighting applications, lighting engineers must compute the number of light fixtures and their relative spacing to achieve the required illumination in terms of the area to be illuminated and the number of foot candles of light at the illuminated areas. Unfortunately, conventional light fixtures available for this purpose are not variable either in the amount or the area of illumination produced at a given distance from the fixture. Consequently, the lighting engineer is greatly limited in his design in terms of the number and spacing of the light fixtures employed. The optical system or projector of the invention allows the lighting engineer much greater flexibility in design and the more economic use of light fixtures to produce the desired illumination.

In accordance with the invention and the objects thereof, the projector of the invention employs a pair of spaced apart refracting elements aligned on an optical axis, in which the refracting elements have a plurality of parallel lens shaped surfaces extending across a face thereof, and in which these refracting elements are relatively rotatable about the optical axis. The refracting elements are supported within a projector enclosure open on one end through which the light is projected, and a light source is supported or contained within the projector enclosure so that light is directed onto the face of one of the refracting elements. The area of illumination on the object or subject onto which the light is projected depends upon the relative orientation between the lens shaped surfaces of the refracting elements. Varying the relative orientation by rotating the refracting elements relative to each other varies the area of illumination. A simple handle or lever is attached to the rotatable refracting element so that this element may be manually rotated relative to the other refracting element to vary the area of illumination projected onto the desired physical setting.

Various specific embodiments of the system employ various designs of the refracting elements to produce different results in terms of the amount of variation of the area of illumination as a function of the degree of rotation, and the configuration of the area of illumination. In one particular embodiment, the two refracting elements employed each has a planar face and a plurality of cylindrical shaped surfaces extending across the other face thereof. The cylindrical shaped surfaces of the two refracting elements are disposed facing each other and are essentially identical. The two refracting elements are spaced apart by the addition of the focal lengths of the individual cylindrical lens shaped surfaces. The light source employed with this particular system comprises a light filament disposed substantially at the focal length of a parabolic reflector with the parabolic reflector disposed rearward of one of the refracting elements, so that a collimated beam of light is directed onto the planar face of this refracting element. When the two refracting elements are aligned, this being the case where the parallel cylindrical shaped surfaces extending across the faces thereof are parallel to each other, the system has no magnification or power and the area of the illumination projected onto the object or subject is substantially equal to the area of the refracting elements themselves. When the refracting elements are aligned in this manner, the spread produced by one element is cancelled by the other element. As one of the refracting elements is rotated relative to the other refracting element about the optical axis upon which they are aligned, both a vertical and horizontal spread of the light passing through the elements are effected, so that the illuminated area is increased. In fact, the area of illumination is proportional to the degree of relative rotation between the refracting elements. The greatest area of illumination is achieved when the two refracting elements are disposed 90° to each other.

Many different lens shaped surfaces can be employed in the face of the refracting elements to produce different effects and different degrees of magnification and power of the system. Moreover, the overall profile of the refracting elements themselves are, in some embodiments, curved or formed in the shape of a lens for a yet different effect. Accordingly, different light sources, other than collimated light, can be employed.

It has been found that it is generally undesirable to include a sharp surface in the face of the lens, such as in the case of a lenticulated refracting element having a plurality of parallel but contiguous cylindrical surfaces extending across the face thereof. The sharp surfaces, lines or grooves as the case may be, between adjacent cylindrical surfaces tend to produce bright or dark spots or lines in the image of the area of illumination. To avoid this, any sharp groove or surface is avoided and eliminated in the manufacture of the refracting elements that are employed in the system of the invention. In particular, rounded surfaces are employed between adjacent lens shaped surfaces that extend across the face of the refracting elements. An exception to this is the case where the system is designed for use as an indicator signal leaving a broad spread of projected illumination, such as for indicator signals on high speed freeways and railroads, since sharp lines of light projection more effectively attract the attention.

Many other objects, features and advantages of the present invention will become readily apparent from the following detailed description thereof when taken in conjunction with the appended claims and the attached drawing wherein like reference numerals refer to like parts throughout the several figures, and in which:

FIGURE 1 is a schematic view, in perspective, illustrating the principle of the projector system of the invention;

FIGURE 2 is a side elevational view, in section, of one embodiment of the projector system of the invention;

FIGURE 3 is a perspective view of the projector shown in FIGURE 2;

FIGURE 4 is a fragmentary elevational view, in section, of a pair of refracting elements that can be employed in the system of the invention;

Figure 5:
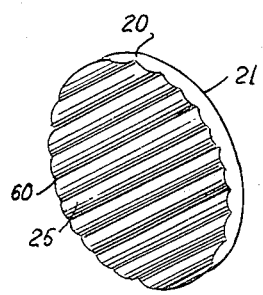
FIGURE 5 is a perspective view of one of the refracting elements showing the plurality of lens shaped surface in one face thereof.

The principle of operation of the optical projecting system of the invention is shown in the schematic view, in perspective, of FIGURE 1 wherein a pair of spaced refracting elements 20 and 22 are aligned on an optical axis, and through which light is transmitted from a light source to be projected onto a subject or object for illuminating same. Although the refracting elements can take on many different forms, as will be described in detail below, reference will be made at this time to a particular embodiment of the refracting elements. The refracting elements have planar faces 21 and 23, and are lenticulated in the surfaces of the other faces thereof. In particular, the lenticulated face of refracting element 22 is illustrated in FIGURE 1 and comprises a plurality of parallel lens shaped surfaced 25 extending across the face thereof. Refracting element 20 has an identical lenticulated face, wherein the two refracting elements are spaced apart and disposed with their lenticulated faces opposing each other. The refracting element 22 is rotatable relative to refracting element 20 about the optical axis of alignment.

A lamp 26 is disposed rearward of refracting element 20 and is positioned substantially at the focal point of a parabolic refractor 28 to direct parallel rays of light, or a collimated beam, onto the planar face 21 of the refracting element 20. Light is transmitted through the refracting elements so as to project light onto a remote object or surface to be illuminated.

The various effects on the light transmitted through the refracting elements will be described and explained below in detail. However, it will be noted in the operation of the system that an area 30 of illumination is projected which is substantially equal to the area of the refracting elements when the plurality of parallel lens shaped surfaces extending across the faces of the two refracting elements are parallel to each other. The shape of the illuminated area 30 essentially corresponds to the shape or profile of the filament of the lamp 26 when the refracting elements are in this orientation. As refracting element 22 is rotated relative to element 20, the area 32 of illumination is increased proportionately and takes on a slightly elongated configuration having its long axis disposed at an angle intermediate the orientations between the lens shaped surfaces of the two refracting elements. The largest area 34 of illumination is achieved when the lenticulated faces of the two refracting elements are disposed 90° to each other, wherein the area of illumination appears as a larger pattern of the filament lamp.

A side elevational view, in section, of one embodiment of the invention is shown in FIGURE 2 and includes the components shown in FIGURE 1 combined within a projector housing for supporting the components. The projector housing 40 within which the components are held comprises a cylindrical enclosure closed at the rear end thereof and open at the front end 46 thereof. A pair of spaced apart annular flanges 42 and 43 project from the inner surface of the enclosure between which refracting element 20 is supported. Another pair of spaced apart annular flanges 44 and 45 project from the inner surface of the enclosure adjacent the open end of the projector housing between which the second refracting element 22 is rotatably supported. A slot 54 is provided in the projector housing that opens between the flanges 44 and 45 and extends at least one-quarter or 90° of the circumference of the enclosure perpendicular to the axis thereof, all as seen more clearly in the perspective view of FIGURE 3. A clamp 50 is attached to element 22 at the periphery thereof and includes a lever or handle 52 extending through slot 54 for manually rotating element 22 about the optical axis of the system.

Another annular flange 48 extends from the inner surface of the projector housing around the inner circumference thereof in spaced relation from element 20 and is disposed rearward thereof, and a parabolic reflector 28 is supported within the housing by flange 48. The lamp 26 is supported from the parabolic reflector at substantially the focal point thereof so that light is directed onto the planar face 21 of element 20 in a collimated beam or in parallel rays. Electrical leads 30 extending through the rear of the housing are connected to any suitable supply voltage (not shown). Any suitable stand or support 56 is attached to the bottom of the projector housing to support the projector, wherein the stand can be of the type that is variable in height and angle to direct the light from the system.

Any other suitably designed projector housing can also be used that supports the refracting elements in spaced relation to each other and which includes means for rotating one of the elements, and includes provision for supporting the proper light source.

The two refracting elements 20 and 22 shown in the particular embodiment of FIGURE 2 are identical in that each has a planar face and a lenticulated face opposite thereto that comprises a plurality of parallel cylindrical surfaces extending across the surface thereof. Each of the surfaces disposed across the face of the refracting element is essentially identical to the others in shape, curvature and focal length. In this particular embodiment, the two refracting elements are separated by a distance equal to twice the focal length of one of the cylindrical surfaces, as will be explained in more detail below.

An enlarged fragmentary view, in section, of the two refracting elements employed in the projector of FIGURE 2 is shown in FIGURE 4, wherein the parallel lens shaped surfaces extending across the faces of the refracting elements are parallel to each other. It was noted above that each of the lens shaped surfaces of the refracting elements in this embodiment constitutes a cylindrical surface that extends across the face of the element. Thus refracting elements 20 and 22 have plurality of adjacent cylindrical shaped surfaces 24 and 25, respectively, extending across the face thereof, as is seen in perspective in FIGURE 5. The refracting elements are disposed perpendicular to the collimated beam of light from the light source and thus, as the light enters the left planar fact 21 of element 20, no refraction takes place. There are illustrated a pair of light rays 66 and 68 as refracted by the two refracting elements as they pass therethrough. As the light rays emerge from the lenticulated surface 24, they are refracted to cross at the focal point 70 of the particular lens surface from which they emerge. These light rays enter refracting element 22 through an opposite lens shaped surface and are accordingly refracted. Since the second refracting elements is spaced a distance from focal point 70 equal to its focal length, the light rays emerge from the planar face 23 of this refracting element as parallel rays as denoted by numerals 72 and 74. Thus when the two refracting elements are in alignment with each other, in a rotational sense, no net deviation of the light occurs, there is no magnification or power of the system and the area of the object which is illuminated by the projected light is, essentially, equal to the area of the refracting elements. It will be noted from the physical construction of the refracting elements that the first refracting element causes a spreading of the light in one direction. That is to say, the cylindrical shape surfaces 24 are disposed horizontally as shown in FIGURE 4, and consequently, the light is spread vertically over an angle determined by the focal length or radius of curvature of the cylindrical shaped surfaces. When refracting element 22 is aligned with refracting element 200, the vertical spread is cancelled to reform parallel rays.

The projected light pattern corresponds very nearly to the shape of the lamp, whereby the light pattern constitutes an image of the object lamp. When the two refracting elements are disposed so that the lens shaped surfaces are at an angle to each other, a slight elongation of the projected light pattern is effected.

For soft light or spot flooding applications, such as for stage lighting effects and lighting in general, it is desirable to produce a projected light pattern the intensity of the light of which is constant across the pattern. It has been found that sharply defined grooves contained within the lenticulated faces of the refracting elements can cause dark and light lines to appear as images at the area of illumination on the object onto which the light is directed. To eliminate this undesirable effect for these particular applications, a rounded groove is provided that runs parallel with the cylindrical shaped surfaces to separate adjacent surfaces. The rounded shape of this groove 60 in the lenticulated face of refracting element 20 is seen both in FIGURE 4 and in the perspective view of FIGURE 5. Similarly, the grooves 62 between adjacent cylindrical shaped surfaces of refracting element 22 are rounded. This essentially eliminates any sharp image of lines from being formed at the area of illumination.

Figure 6:
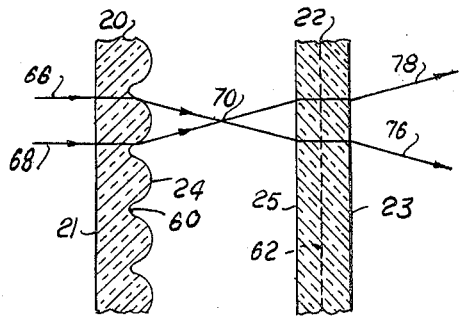
FIGURE 6 is a fragmentary view, in section, of the pair of refracting elements shown in FIGURE 4 when one of the refracting elements is rotated to a position 90° relative to the other refracting element, and in which the effects on light rays passing therethrough is shown.

A fragmentary view, in section, of the two refracting elements when disposed 90° to each other is shown in FIGURE 6, wherein refracting element 22 has been rotated 90° with respect to refracting element 20 about the optical axis of the system. Light rays 66 and 68 entering the left face 21 of element 20 are again focused at focal point 70 between the two elements. For present purposes, it will be assumed that light rays 66 and 68 are aligned vertically so as to illustrate the net vertical spread of the system. The cylindrical shaped surfaces constituting the lenticulated face of refracting element 22 are disposed vertically, and it will be further assumed that these light rays enter the cylindrical surface 25 of this element at the vertex thereof. Thus, the line constituting the vertex of cylindrical surface 25 and the rear planar surface 23 constitute, in effect, two parallel surfaces through which the light rays are refracted. Thus the light rays from focal point 70 are refracted in a converging manner upon entering the surface 25 and are refracted in a diverging manner as rays 76 and 78 when emerging from the planar surface 23. Because of the parallelism of the two surfaces, ray 76 and 78 emerge parallel, but shifted, to the rays emerging from focal point 70. Thus the vertical spread of these rays are essentially unaffected by the refraction of the second refracting element 22 except for the shift.

Other rays of light not striking the vertex of the cylindrical surface 25 and those which are not aligned vertically are refracted differently. An analysis of the system when the two refracting elements are disposed as shown in FIGURE 6 shows that the second refracting element 22 increases, to some extent, the vertical spread created by the first refracting element 20. In addition, the second refracting element 22 spreads the light horizontally to essentially the same extent as the vertical spread. Thus the area of illumination, denoted 34 in FIGURE 1, is enlarged over that produced for angular positions less than 90°.

Figure 7:
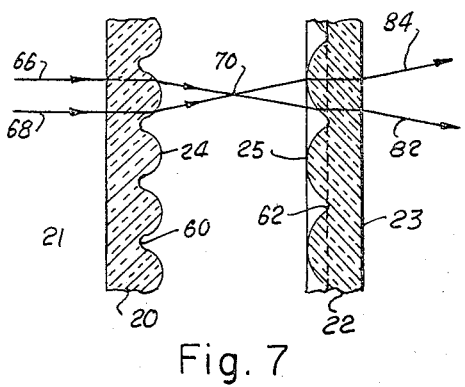
FIGURE 7 is a fragmentary view, in section, of the pair of refracting elements shown in FIGURE 4 when one of the refracting elements is rotated to a position between 0° and 90° relative to the other element.

An illustration of a pair of light rays passing through the refracting elements when the second refracting element 22 is rotated to a position between 0° and 90° relative to refracting element 20 is shown in the fragmentary view, in section, of FIGURE 7. The light rays 66 and 68 are affected the same way passing through refracting element 20. However, these rays impinge upon the lenticulated surface of element 22 at different angles because of the angular orientation of the second refracting element, and are therefore refracted differently as illustrated by emerging rays 82 and 84. A three dimensional array of light rays can be visualized in which the first refracting element produces a vertical spread of the light from the light source, and whereby the second refracting element produces both a vertical and horizontal spread. For example, when the two refracting elements are disposed at 45° to one another, some of the vertical spread caused by refracting element 20 is cancelled by refracting element 22. In addition, refracting element 22 produces a net horizontal spread in the light pattern due to the angular position of the plurality of cylindrical shaped surfaces relative to those of refracting element 20, but this horizontal spread is not as great as the vertical spread. Thus the pattern as projected on the object to be illuminated is oblong but larger than the area of the refracting elements.

As refracting element 22 is rotated to a greater angular deviation from refracting element 20 and is finally disposed in a position 90° thereto, very little of the vertical angular spread created by the first refracting element 20 is cancelled by the second refracting element 22, but at the same time, a maximum horizontal spread is created by the second refracting element 22.

The oblong pattern produced by the system when the refracting elements are rotated to a position between 0° and 90° to each other is very desirable in some applications. For example, an essentially rectangular pattern, although slightly rounded, enables a lighting engineer to more readily calculate lighting requirements for enclosures, which are usually rectangular in shape. The particular size and shape of the pattern is selected by the simple expedient of rotating one refracting element relative to the other, thus facilitating design flexibility with a single, basic light fixture. Stage border lighting effects are also more accurately achieved with rectangular patterns.

It will be noted that essentially all of the light from the light source enters the planar face 21 of the first refracting element 20, and that only the degree of spreading is changed as the two refracting elements are rotated relative to each other. Thus, there is no loss in efficiency of the system in that all of the light is transmitted and projected. In contrast to this, conventional systems that employ a variable opening shutter or light source movable relative to the refracting elements cut out a part of the light for most settings, thus wasting the use of this light.

Indicator signal applications do not require a soft lighting or spot flooding effect to the extent required by some other applications. In fact, it is desirable in most instances to concentrate the light in the pattern. For high speed automobile freeways and railroads that include turns or curves, it is very desirable that indicator signals yield a broadly spread pattern to enable the automobile operator or railroad engineer to view the indicator from some distance and at a broad angle, such as when approaching the signal around a curve. The optical system just described readily provides this spread. To concentrate the light at spacings over the projected pattern, the sharply defined grooves between adjacent lens shaped surfaces on the lenticulated faces of the elements are not rounded, so that images of the grooves will appear in the overall pattern. As one approaches such an indicator signal from around a curve, the general pattern of the light is observed along with concentrated images spaced throughout the pattern.

Figure 8:
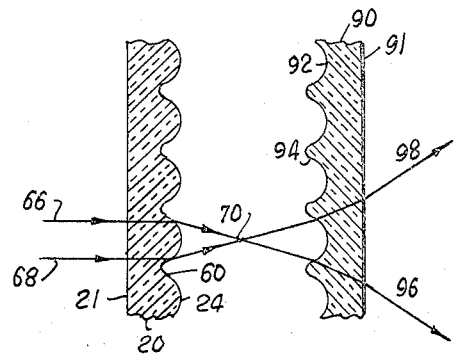
FIGURE 8 is a fragmentary view, in section, of another pair of refracting elements that can be employed in the projector.

Another embodiment of a pair of refracting elements for use with the projector system of the invention is shown in the fragmentary, side elevational view, in section, of FIGURE 8. The first of the refracting elements is identical to the elements employed in the system shown in FIGURE 4, and comprises the same refracting element 20 having a planar face 21 and a lenticulated face comprised of a plurality of parallel, cylindrical shaped surfaces 25 separated by rounded grooves 60. The second refracting element 90 through which the light rays are transmitted and refracted has a lenticulated face 92 comprised of a plurality of parallel, cylindrical shaped surfaces extending across the face, wherein the cylindrical lens shaped surfaces are concave rather than convex. Adjacent lens shaped surfaces of this refracting element are separated by rounded, convex ridges 94 for the same purpose as the rounded, concave grooves 60 of refracting element 20. The lenticulated face of element 90 is disposed facing the lenticulated face of element 20 in opposing relation therewith. Element 90 also has a planar face 91 opposite its lenticulated face.

The distance of separation between the two refracting elements 20 and 90 can be adjusted to yield different effects. It will be assumed, however, that the two elements are separated by the same distance of separation as are the refracting elements of the embodiment shown in FIGURE 4. The two light rays 66 and 68 will again be used for illustrative purposes to show the effect on these rays as they are transmitted through the two refracting elements. Rays 66 and 68 are again focused at focal point 70 substantially midway between the two refracting elements and proceed to intersect a concave lens shaped surface of element 90. It will be apparent from this figure that the relative orientation between the two refracting elemens is 0°. Rays 66 and 68 are refracted or bent toward the normal to the concave lens shaped surfaces upon entering this surface so as to increase the vertical divergence of these rays. These rays emerge as rays 96 and 98, respectively, from planar face 91 of element 90 and are refracted or bent away from the normal to this planar surface. Thus rays 96 and 98 are diverged to an even greater extent upon leaving the second face, so that refracting element 90 increases the vertical spread of the rays over that produced by refracting element 20. As refracting element 90 is rotated relative to element 20, a horizontal spread of the light rays is effected to produce patterns similar to that described with reference to the system shown in FIGURE 4. The two embodiments differ in that the embodiment shown in FIGURE 8 produces a greater spreading of the light from the light source than does the previous embodiment, and has particular application for soft lighting or spot flooding of objects relatively close to the projector.

Figure 9:
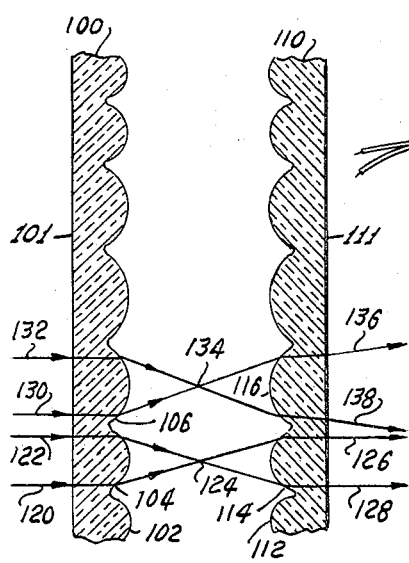
FIGURE 9 is a fragmentary view, in section, of still another pair of refracting elements that can be employed in the projector.

A variation of the refracting element construction shown in FIGURE 4 is shown in the fragmentary, side elevational view, in section, of FIGURE 9, wherein each of the refracting elements again have a planar face and a lenticulated face comprised of a plurality of parallel, cylindrical shaped surface. The first refracting element 100 has a planar face 101 and an opposite lenticulated face 102. The lenticulated face comprises a plurality of parallel, cylindrical shaped surfaces extending across the face thereof the radii of curvatures of which increase in a graduated manner from the periphery of the refracting element to the center thereof, or toward the optical axis of the system, and then decreases from the center to the periphery. For example, cylindrical shaped surface 104 has a radius of curvature smaller than the adjacent cylindrical surface 106, the latter being disposed closer to the optical axis of the system.

The second refracting element 110 has a planar face 111 and a lenticulated face 112 disposed in opposing relationship to lenticulated face 102 of element 100. This refracting element is of identical construction and includes a plurality of parallel, cylindrical shaped surfaces having graduated radii that increase toward the center of the system, as illustrated by surfaces 114 and 116 opposite surfaces 104 and 106, respectively, of element 100.

The distance of separation between the refracting elements can be varied to produce different results, especially because of the different radii of the various refracting surfaces. Assuming for purposes of explanation that the refracting elements are separated by twice the focal length of identical and opposite cylindrical shaped surfaces 104 and 114, parallel light rays 120 and 122 entering the planar face 101 of element 100 will converge at the focal point 124 of surface 104. Since focal point 124 is also the focal point for surface 114 of the opposite refracting element, the rays will emerge from planar face 111 in parallel fashion as denoted by rays 126 and 128, respectively. This is for the condition of the two refracting elements being situated at 0° relative to each other, as is apparent from the figure. Another set of parallel light rays 130 and 132 entering planar face 101 perpendicular thereto are focused at focal point 134 of cylindrical surface 106. Because of the larger radius of this surface, focal point 134 is closer to the second refracting element than is focal point 124. As the light rays enter cylindrical surface 116 of the second refracting element, they are bent toward the normal but are still diverging, since the object distance from this surface is inside the focal length thereof. As these light rays emerge from planar face 111 as light rays 136 and 138, respectively, they are bent away from the normal and are divergent. Thus the overall effect of the projected area of illumination of the system shown in FIGURE 9 is to redistribute the light patter according to the distance of separation between the two refracting elements and the angular orientation therebetween. In the particular instance shown in FIGURE 9, the light is more heavily concentrated at the peripheral part of the pattern. By spacing the refracting elements apart by a distance equal to the addition of the focal lengths of the larger radii lens surfaces, the light intensity can be increased at the center of the pattern. The particular light intensity within the projected pattern will also depend upon the distance of the object onto which the pattern is projected from the projector itself. As refracting element 110 is rotated relative to element 100, a more diverging and larger pattern is produced, similar to that previously described.

The embodiments of the system described up to this point are usually used in conjunction with a light source that projects a collimated beam of light onto the planar surface of the first refracting element. However, it will be emphasized that a collimated light is not required in those systems previously described, and that the system of refracting elements can be used with any light source.

Figure 10:
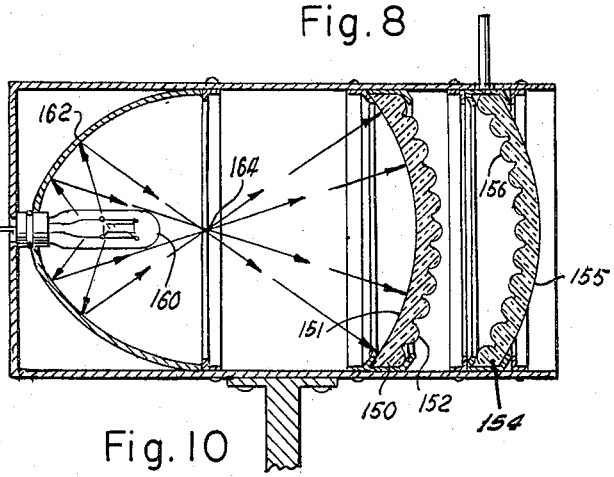
FIGURE 10 is a side elevational view, in section, of yet another embodiment of the invention that employs still different refracting elements.

An embodiment of the invention that is especially adapted for us with a light source that produces a diverging pattern of light rays, or one which approximates a point source of light, is shown in the side elevational view, in section, of FIGURE 10. Only the essentials of the system are shown and the projector housing is eliminated for purposes of clarity. This system comprises a pair of oppositely disposed refracting elements 150 and 154, each having a smooth surface and a lenticulated surface. The overall profile of refracting element 150 is shaped in the form of a spherical surface (but can also be shaped in the form of other surfaces, such as, for examples, ellipsoidal or parabolic surfaces), wherein the element 150 has a smooth surface 151 defining a spherical surface and a lenticulated surface 152 comprised of a plurality of parallel, cylindrical lens shaped surfaces extending thereacross. In other words, the refracting element 150 is identical to refracting element 20 shown in FIGURE 4 with the exception that the entire refracting element is formed in the shape of a spherical surface or spherical profile. Refracting element 154 is of similar construction but comprises a smooth convex surface 155 defining a spherical surface and a lenticulated face 156 similar to lenticulated face 152. The lenticulated faces are disposed facing each other.

A lamp 160 is disposed substantially at the focal point of an ellipsoidal reflector 162 and is supported thereby, so that light rays from the lamp are reflected by the ellipsoidal reflector to cross a focal point 164 that coincides with the radius of curvature of surface 151 of the first refracting element. Thus the light rays strike surface 151 normal thereto along radial lines. The effect on the light rays is the same as that described with reference to FIGURE 4, with the exception that the light rays emerge from the smooth surface 155 of the second refracting element in a diverging manner because of the profile of the two refracting elements. Thus a greater area of projected illumination is effected by this embodiment of the system. As the second refracting element is rotated relative to the first refracting element about the optical axis of the system, yet greater divergence is produced.

The system of the invention has been described with reference to particular embodiments thereof, wherein each of the embodiments are useful in many different lighting applications. The extreme simplicity of the system for varying the light pattern, both in shape and size, is evident, as is the high efficiency of the system. It is undoubtedly true that other modifications and substitutions can be made to the system without departing from the true scope of the invention, as will become readily apparent to those skilled in the art. Accordingly, it is intended that the invention be limited only by the appended claims.

What is claimed is:

1. An optical projection system for projecting light onto an object in which the area of projected illumination is selectively variable, comprising:
    (a) a projector housing having an open end through which light is projected,
    (b) a light source contained within said housing,
    (c) first and second spaced apart refracting elements contained within said housing aligned on an optical axis and through which light from said light source successively passes and is projected out said open end, each having a plurality of cylindrical lens shaped surfaces extending across a face thereof in parallel relation,
    (d) said first and said second refracting elements having said cylindrical shaped surfaces thereof facing each other and being spaced apart by a distance equal to the addition of the focal lengths thereof, and each having a planar face opposite the face having cylindrical shaped surfaces, and
    (e) means for effecting relative rotation between said first and said second refracting elements about said optical axis to vary said area of projecting illumination as a function of the degree of rotation therebetween.

2. An optical system as set forth in claim 1 wherein said lens shaped surfaces of said first and said second refracting elements are substantially identical and are convex.

3. An optical system as set forth in claim 1 wherein said lens-shaped surfaces of said first and said second refracting elements are substantially identical and are concave.

4. An optical projection system for projecting light onto an object in which the area of projected illumination is selectively variable, comprising:
    (a) a projector housing having an open end through which light is projected,
    (b) a light source contained within said housing,
    (c) first and second spaced apart refracting elements contained within said housing aligned on an optical axis and through which light from said light source successively passes and is projected out said open end, each having a plurality of rounded lens shaped surfaces extending across a face thereof in parallel relation,
    (d) said first refracting element being disposed adjacent said open end and being shaped in the form of a spherically curved lens having a smooth convex face facing said open end and an opposite concave face containing said plurality of parallel lens shaped surfaces, said second refracting element being shaped in the form of a spherically curved lens having a smooth concave face facing said light source and an opposite convex face containing said plurality of parallel lens shaped surfaces,
    (e) an ellipsoidal reflector for directing dievrging rays of light onto said smooth concave face of said second refracting element along radial lines from the center of curvature of said concave face, and
    (f) means for effecting relative rotation between said first and second refracting elements about said optical axis to vary said area of projected illumination as a function of the degree of rotation therebetween.

References Cited

UNITED STATES PATENTS

| 2,220,639 | 11/1940 | Borsarelli | 240—106 |
| 2,253,409 | 8/1941 | Winkler et al. | 240—41.3 |
| 2,366,356 | 1/1945 | Rolph | 240—106.1 XR |
| 1,678,861 | 7/1928 | Kalkner | 240—41.3 |
| 2,182,155 | 12/1939 | Martin | 240—106.1 |
| 2,712,060 | 6/1955 | Johnson | 240—61.13 |
| 2,848,601 | 8/1958 | Beach | 240—10.6 XR |

NORTON ANSHER, Primary Examiner

R. P. GREINER, Assistant Examiner

U.S. Cl. X.R.

240—106